United States Patent
Staykov et al.

(10) Patent No.: US 9,722,795 B2
(45) Date of Patent: Aug. 1, 2017

(54) DIGITALLY SIGNING JSON MESSAGES

(71) Applicant: VMware, Inc., Palo Alto, CA (US)

(72) Inventors: Georgi Staykov, Sofia (BG); Deyan Popov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 193 days.

(21) Appl. No.: 14/282,867

(22) Filed: May 20, 2014

(65) Prior Publication Data
US 2015/0341176 A1   Nov. 26, 2015

(51) Int. Cl.
*H04L 9/32*   (2006.01)

(52) U.S. Cl.
CPC ........ *H04L 9/3247* (2013.01); *H04L 2209/68* (2013.01)

(58) Field of Classification Search
CPC ...... G06F 21/64; H04L 9/3247; H04L 9/3236
USPC ......................................... 713/176, 189–193
See application file for complete search history.

(56) References Cited

U.S. PATENT DOCUMENTS

| | | | |
|---|---|---|---|
| 8,291,230 B2* | 10/2012 | Moore | H04L 9/3236 709/206 |
| 8,533,665 B2* | 9/2013 | Yu et al. | 717/108 |
| 8,538,020 B1* | 9/2013 | Miller | 380/259 |
| 8,635,442 B2* | 1/2014 | Agrawal | H04L 9/3268 713/155 |
| 2010/0185862 A1* | 7/2010 | Moore | H04L 9/08 713/171 |
| 2010/0185869 A1* | 7/2010 | Moore et al. | 713/179 |
| 2012/0198234 A1* | 8/2012 | Chung et al. | 713/171 |
| 2013/0080785 A1* | 3/2013 | Ruhlen et al. | 713/176 |
| 2014/0229737 A1* | 8/2014 | Roth et al. | 713/176 |
| 2015/0128032 A1* | 5/2015 | Staykov | G06F 21/64 715/239 |

* cited by examiner

Primary Examiner — Mohammed Waliullah

(57) ABSTRACT

Systems and techniques are described for digitally signing JavaScript Object Notation (JSON) messages. One of the techniques includes receiving a JavaScript Object Notation (JSON) message; and digitally signing the JSON message, wherein digitally signing the JSON message comprises: generating a digital signature information JSON object; inserting the digital signature information JSON object into the JSON message; generating a canonical representation of the JSON message with the inserted digital signature information JSON object; generating a digital signature of the canonical representation of the JSON message; and inserting the digital signature into the digital signature information JSON object.

20 Claims, 4 Drawing Sheets

DIGITALLY SIGNING JSON MESSAGES

BACKGROUND

This document relates to digitally signing JavaScript Object Notation (JSON) messages.

JavaScript Object Notation (JSON) is a data-interchange format that is built on two structures: objects and arrays. A JSON object is an unordered set of name/value pairs. Each JSON object begins with a left brace ({) and ends with a right brace (}). Each name/value pair inside an object is separated by a comma (,) and, within each name/value pair, the name is followed by a colon (:). A JSON array is an ordered collection of values. Each JSON array begins with a left bracket ([) and ends with a right bracket (]). Values within an array are separated by commas (,).

SUMMARY

In general, one aspect of the subject matter described in this document can be embodied in methods that include the actions of receiving a JavaScript Object Notation (JSON) message; and digitally signing the JSON message, wherein digitally signing the JSON message comprises: generating a digital signature information JSON object; inserting the digital signature information JSON object into the JSON message; generating a canonical representation of the JSON message with the inserted digital signature information JSON object; generating a digital signature of the canonical representation of the JSON message; and inserting the digital signature into the digital signature information JSON object. Other embodiments of this aspect include corresponding computer systems, apparatus, and computer programs recorded on one or more computer storage devices, each configured to perform the actions of the methods.

This and other aspects can optionally include one or more of the following features. The digital signature information JSON object can include data identifying a digital signature algorithm used to generate the digital signature. The data identifying the digital signature algorithm can include data identifying a cryptographic hash function. Generating the digital signature of the canonical representation can include: computing a cryptographic hash of the canonical representation using the cryptographic hash function; generating the digital signature by encrypting the cryptographic hash using a private key; and encoding the digital signature. Digitally signing the JSON message can further include: inserting data identifying a public key corresponding to the private key in the digital signature information JSON object. The digital signature information JSON object can include data defining a validity period of the digital signature. The digital signature information JSON object can include a unique identifier for the JSON message.

In general, another aspect of the subject matter described in this document can be embodied in methods that include the actions of receiving a JavaScript Object Notation (JSON) message, wherein the JSON message includes a digital signature information JSON object, and wherein the digital signature information JSON object includes a digital signature for the JSON message; and verifying the digital signature for the JSON message, wherein verifying the digital signature for the JSON message comprises: removing the digital signature from the digital signature information JSON object; generating a canonical representation of the JSON message without the digital signature; computing a cryptographic hash of the canonical representation; decrypting the digital signature; and verifying the digital signature based on a comparison between the decrypted digital signature and the cryptographic hash. Other embodiments of this aspect include corresponding computer systems, apparatus, and computer programs recorded on one or more computer storage devices, each configured to perform the actions of the methods.

This and other aspects can optionally include one or more of the following features. The digital signature information JSON object can include data identifying a cryptographic hash function used to generate the first digital signature. Computing the cryptographic hash of the canonical representation can include computing the cryptographic hash of the canonical representation using the cryptographic hash function. Decrypting the digital signature can include decrypting the digital signature using a public key identified in the digital signature information JSON object. The digital signature information JSON object can include data defining a validity period of the digital signature, and verifying the digital signature can include determining that the validity period is satisfied. The digital signature information JSON object can include a unique identifier for the JSON message, and verifying the digital signature can include determining that no JSON message with an identifier that matches the unique identifier has already been verified.

Particular embodiments of the subject matter described in this document can be implemented so as to realize one or more of the following advantages. Security Assertion Markup Language (SAML) tokens and other authentication data can be securely transmitted within JSON messages. By generating a digital signature of a JSON message using a canonical representation of the message, messages that are transformed after being digitally signed into a representation that is logically equivalent but physically different documents can nonetheless have their digital signature verified, reducing unnecessary and undesirable verification failures. Additionally, replay attacks can be prevented by including a timestamp and a unique identifier for the message in the signed message.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
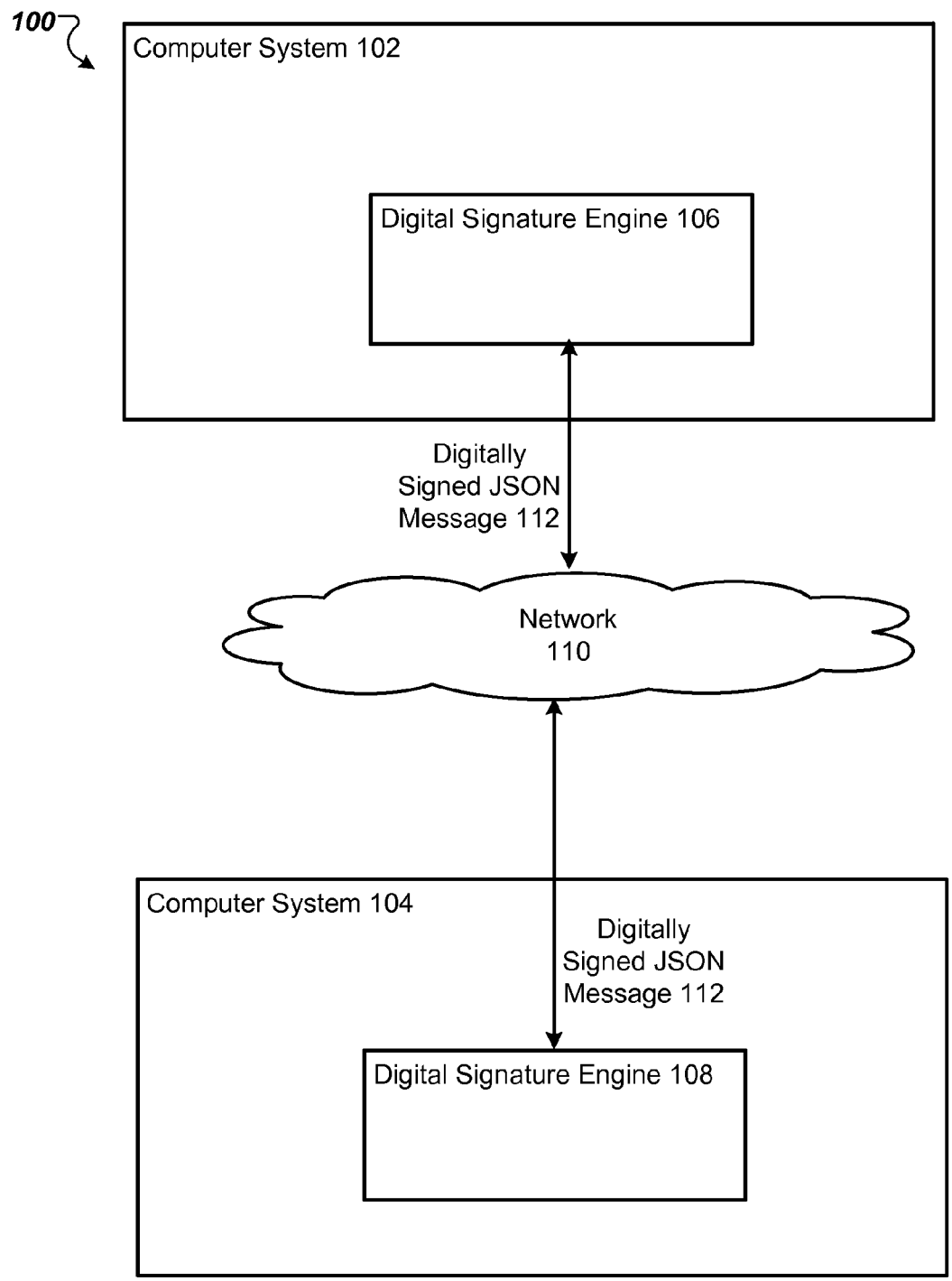
FIG. 1 shows an example environment in which two computer systems communicate using JavaScript Object Notation (JSON) messages.

FIG. 1 shows an example environment 100 in which two computer systems 102 and 104 communicate using JavaScript Object Notation (JSON) messages, i.e., by sending and receiving messages that are formatted using the JSON data-interchange format over a network 110. The network 110 can include, for example, a local area network (LAN), a cellular phone network, a wide area network (WAN), e.g., the Internet, or a combination of them.

Each of the computer systems 102 and 104 includes a respective digital signature engine 106 and 108. In this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The digital signature engines 106 and 108 receive JSON messages that are to be securely transmitted to a recipient and digitally sign the outgoing messages, i.e., by generating a digital signature for each outgoing message that is transmitted with the outgoing message to the message recipient. Digitally signing a JSON message will be described in more detail below with reference to FIG. 2. The digital signature engines 106 and 108 can also receive an incoming digitally signed JSON message and verify the digital signature for the incoming JSON message. Verifying the digital signature for a JSON message will be described in more detail below with reference to FIG. 3.

For example, the digital signature engine 106 of the computer system 102 can digitally sign an outgoing message 112 intended for the computer system 104. The digitally signed message 112 can then be transmitted to the computer system 104 over the network 110, where it is received by the digital signature engine 108. In order to, for example, verify that the message 112 has not been modified since it was digitally signed, the digital signature engine 108 can verify the digital signature of the message 112.

While the example of FIG. 1 shows JSON messages being sent between two computer systems, in some cases, messages sent between different components of the same computer system, e.g., between different processes executing on the same computer system, can be digitally signed by the sending component and then verified by the receiving component.

Figure 2:
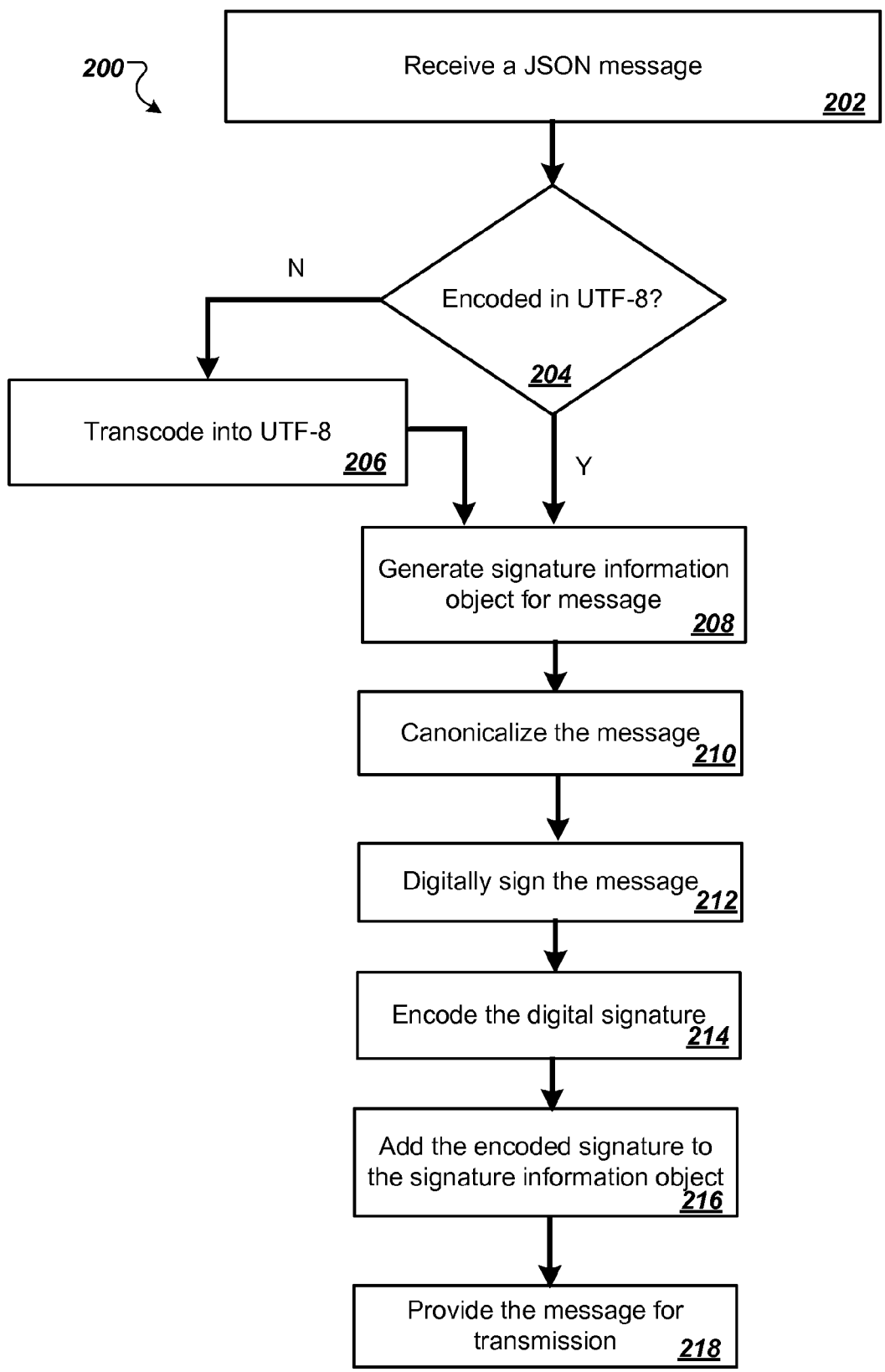
FIG. 2 is a flowchart of an example technique for digitally signing a JSON message.

FIG. 2 is a flowchart of an example technique 200 for digitally signing a JSON message. The technique 200 can be performed by a system of one or more computers located in one or more locations. For example, a computer system, e.g., the computer systems 102 or 104 of FIG. 1, can perform the process 200.

At step 202, the system receives a JSON message. For example, the JSON message may be a message that is to be sent to a recipient in a secure manner and that therefore needs to be digitally signed. For example, in some cases, messages sent between a particular sender and a particular recipient may be required to be digitally signed in order to satisfy a security protocol.

At step 204, the system determines whether the message is encoded in Universal Character Set Transformation Format-8-bit (UTF-8), e.g., by determining whether the message data validates as UTF-8 data.

At step 206, if the message is not encoded in UTF-8, the system transcodes the message into UTF-8 using, e.g., conventional transcoding techniques. Once the message has been transcoded into UTF-8, the technique 200 proceeds to step 208.

At step 208, once the message is encoded in UTF-8, the system generates a signature information object for the message and inserts the signature information object into the message. The signature information object is a JSON object that includes the information necessary to verify the signature for the message. In particular, the signature information object includes data, i.e., one or more name/value pairs, that identifies the signature algorithm that the system is going to use to generate the digital signature. For example, the signature information object may indicate which public-key cryptosystem will be used, e.g., RSA, and which cryptographic hash function will be used, e.g., SHA256. Other example signature algorithms that can be used by the system include the algorithms described in Jones, Michael B., *JSON Web Algorithms*, available at https://tools.ietf.org/html/draft-ietf-jose-json-web-algorithms-14, and which is incorporated by reference.

The signature information object also includes data that defines the validity period for the digital signature. For example, the signature information object can include one name/value pair that defines a current time, i.e., a time that the signature information object was created, and another name/value pair that defines an expiration time, i.e., a time that the validity period for the digital signature should expire. In some implementations, the dates and times that define the validity period are expressed as a date-time string in a pre-determined format: "YYYY-MM-DDThh:mm:ss.sssZ," where YYYY is a four-digit year, MM is a two-digit month, DD is a two-digit day of the month, T is a separator that indicates that the date element has ended and the time element is beginning, hh is a two-digit hour element, mm is a two-digit minute element, ss is a two digit second element, sss is a three digit millisecond element, and Z is a UTC time zone designator. Expressing the dates and times in this manner can promote interoperability, e.g., because the date-time string has a fixed length and is compatible with the standard Extensible Markup Language (XML) datetime format.

Optionally, the signature information object can also include a name/value pair that includes a string that uniquely identifies the message, i.e., a string that has not yet been assigned to any previous message by the system. As will be described below with reference to FIG. 3, when the signature for the JSON message is being verified by the recipient of the message, the unique string can be used to determine whether the message is a duplicate of another message that has already been verified by the recipient. For example, the string can be used by the receiving system in detecting and preventing a replay attack. A replay attack is an attack where a malicious user obtains the signed message and replays it within the time period defined by the timestamp in order to impersonate the user that signed the original message.

At step 210, the system canonicalizes the message. That is, the system generates a canonical representation of the message using a JSON canonicalization technique. Because of the structure of the JSON format, a JSON document can potentially have multiple logically equivalent physical representations. Thus, two JSON documents may be logically equivalent despite having different physical representations. To account for this, the system generates a canonical representation of the message such that another message that is physically different from the message, but that is logically equivalent to the message, has the same canonical representation of the message. For example, the system may use the canonicalization technique described in Staykov, Georgi and Hu, Jeff, *JSON Canonical Form*, available at http://tools.ietf.org/html/draft-staykov-hu-json-canonical-form-00, which is incorporated by reference. Optionally, prior to canonicalizing the message, the system may include in the signature information object for the message an identifier for the canonicalization technique used to generate the canonical representation. For example, if multiple potential canonicalization techniques may be used, the recipient can use the identifier to identify the canonicalization technique that was used to canonicalize a received message.

At step 212, the system generates a digital signature for the canonical representation of the message. The system digitally signs the canonical representation using the signature algorithm identified in the signature information object. For example, the system can generate a cryptographic hash of the canonical representation using the cryptographic hash function specified in the signature information object. The system can then encrypt the cryptographic hash with a private key in order to generate the digital signature. Depending on the cryptographic algorithm being used, the system can communicate the public key that corresponds to the private key to the recipient of the message in any of a variety of ways, e.g., by embedding it in a Security Assertion Markup Language (SAML) token that is inserted in the message. As another example, if the X.509 standard is being used, the system can insert the base64 encoded X.509 certificate in the message.

At step 214, the system encodes the digital signature. For example, the system can encode the digital signature using a base64 encoding scheme. In some implementations, e.g., if an encoding scheme other than base64 is used to encode the digital signature, the system includes a JSON object in the signature information object specifying the different encoding scheme, e.g., base32 or base 128 encoding, that has been used to encode the signature.

At step 216, the system adds the encoded digital signature to the signature information object of the message. The system can add the encoded digital signature to the signature information object in any of a variety of ways. For example, the system can generate an object that includes a name/value pair that has the encoded digital signature as the value and, if a SAML token is available, another name/value pair that has the SAML token as the value. The system then adds the object to the signature information object of the message. As another example, the system can add the name/value pair that has the encoded digital signature as the value and the name/value pair that has the SAML token as the value as additional name/value pairs in the signature information object. In this example, the system may include a JSON object in the signature information object indicating that the signature is embedded directly into the signature information object prior to signing the message.

At step 218, the system provides the message that includes the signature information object for transmission to the intended recipient of the message.

Figure 3:
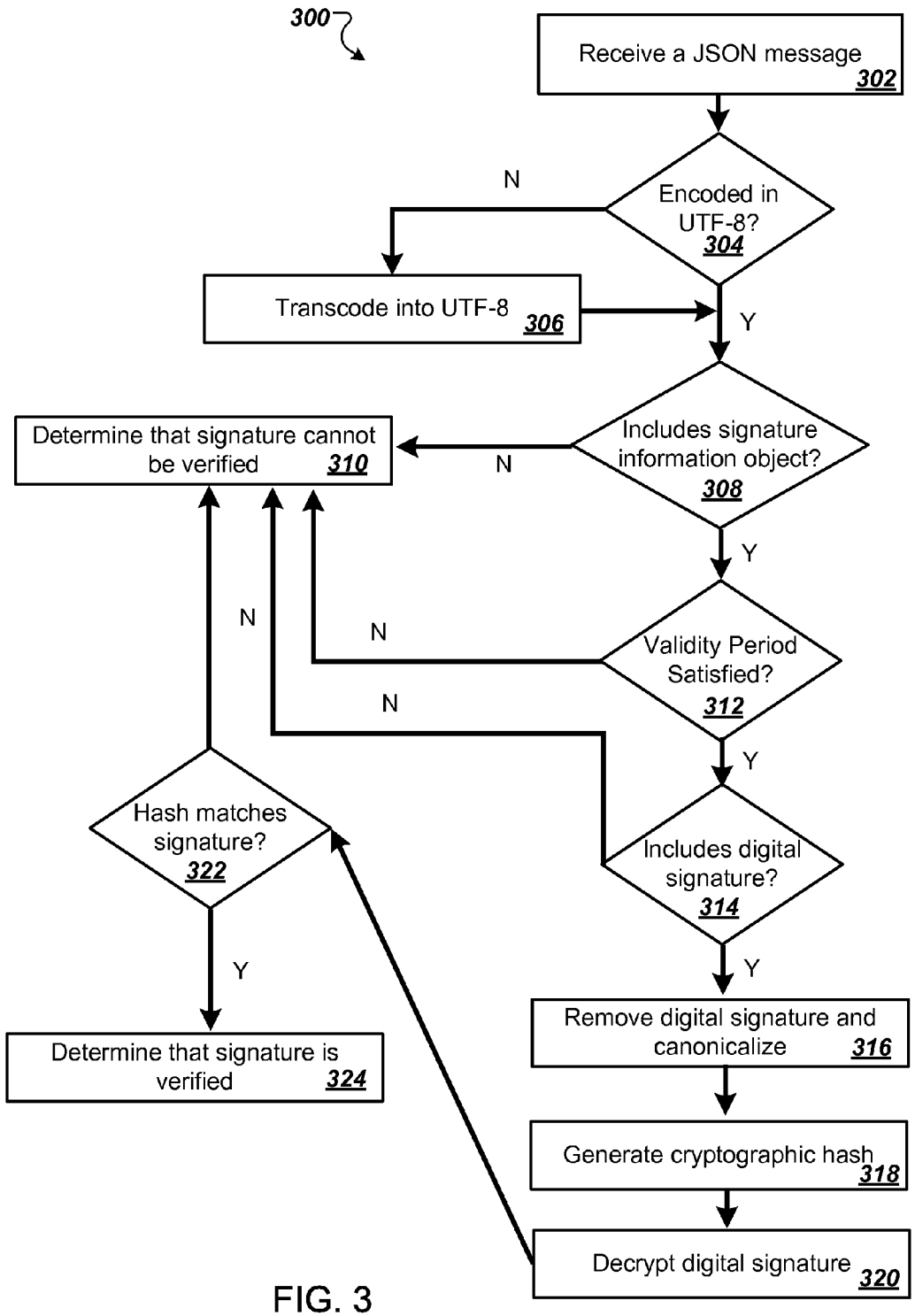
FIG. 3 is a flowchart of an example technique for verifying the digital signature of a JSON message.

FIG. 3 is a flowchart of an example technique 300 for verifying the digital signature of a JSON message. The technique 300 can be performed by a system of one or more computers located in one or more locations. For example, a computer system, e.g., the computer systems 102 or 104 of FIG. 1, can perform the process 300.

At step 302, the system receives a JSON message to be verified.

At step 304, the system determines whether the message is encoded in UTF-8.

At step 306, if the message is not encoded in UTF-8, the system transcodes the message into UTF-8. Once the message has been transcoded into UTF-8, the technique 300 proceeds to step 308.

At step 308, once the message is encoded in UTF-8, the system determines whether the message includes a signature information object. For example, the system can determine whether the message includes a signature information object by analyzing the JSON objects in the message and determining whether any of the objects satisfy specified criteria, e.g., have a name that is one of a set of possible names for the signature information object. At step 310, if the message does not include a signature information object, the system determines that the message cannot be verified. If the message includes a signature information object, the technique 300 proceeds to step 312.

At step 312, the system determines whether the validity period identified in the signature information object is satisfied. For example, the system may determine whether the current time is between a time that the signature information object was generated and an expiration time for the validity period as identified by the appropriate name-value pairs in the signature object. If the validity period is not satisfied or if there is no validity period identified in the signature information object, the system determines that the message cannot be verified (step 310). If the validity period is satisfied, the technique 300 proceeds to step 314.

Optionally, prior to proceeding to step 314, if the signature information object includes a name/value pair that includes a string that uniquely identifies the message, the system can compare the string against identifiers of other messages received by the system within the validity period. If the string matches one of the other identifiers, the system determines that the message has already been accepted during the validity period and therefore determines that the message cannot be verified (step 310). If the string does not match any of the other identifiers, the technique 300 proceeds to step 314.

At step 314, the system determines whether the signature information object includes a digital signature and identifies a public key that the system should use to decrypt the digital signature, e.g., embedded in public key material, e.g., a SAML token or an X.509 certificate. If the signature information object does not include both a digital signature and the public key material, the system determines that the message cannot be verified (step 310). If the digital signature and the public key material are included, the technique 300 proceeds to step 316.

At step 316, the system removes the name/value pair that includes the digital signature from the received message and then canonicalizes the received message to generate a canonical representation of the received message. If the signature information object includes an identifier for a canonicalization technique, the system uses the canonicalization technique that is identified by the signature information object when canonicalizing the message. If no identifier is included in the signature information object, the system uses a pre-determined canonicalization technique to canonicalize the message.

At step 318, the system generates a cryptographic hash of the canonical representation using the cryptographic hash function identified in the signature information object.

At step 320, the system decodes the encoded signature and then decrypts the decoded digital signature using the public key identified in the signature information object.

At step 322, the system determines whether the cryptographic hash matches the decrypted digital signature. For example, the system can perform a byte-by-byte comparison between the cryptographic hash and the digital signature. If the hash matches the decrypted signature, the system determines that the signature is verified at step 324. If the hash and the decrypted signature do not match, the system determines that the signature cannot be verified at step 310.

Figure 4:
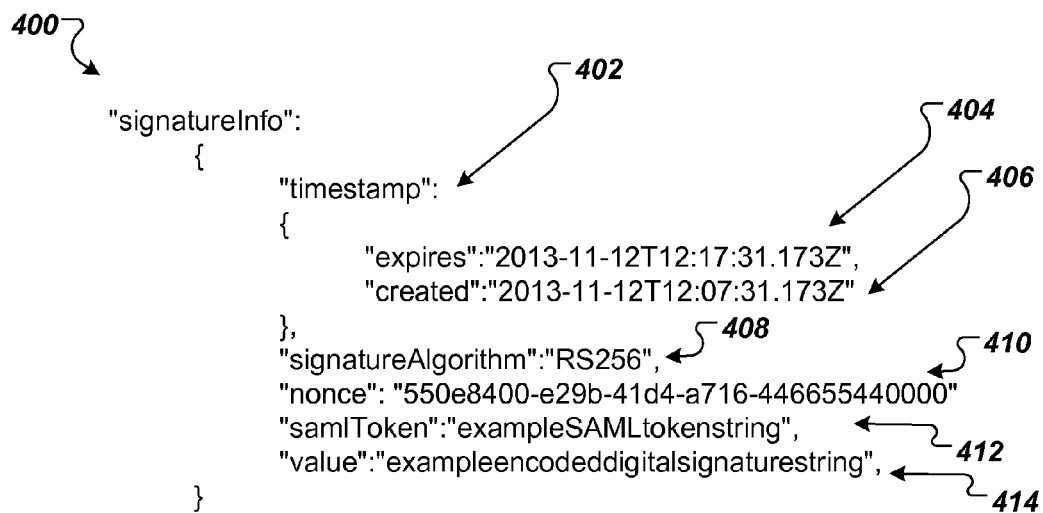
FIG. 4 shows an example digital signature information object.

FIG. 4 shows an example signature information object 400 named "singatureInfo". The signature information object 400 is an example of a JSON object that is inserted into an outgoing JSON message by a digital signature engine, e.g., the digital signature engines 106 or 108 of FIG. 1, while digitally signing the message before the message is sent to a recipient. The signature information object 400 includes information necessary for the recipient of the message to successfully verify the digital signature upon receipt of the message.

For example, the object 400 includes an embedded "timestamp" object 402 that includes data that defines the validity period for the digital signature for the JSON message. The "timestamp" object 402 includes an "expires" name-value pair 404 that defines the expiration time for the digital signature and a "created" name-value pair 406 that defines the time that the signature information object was created. The name-value pairs 404 and 406 can be used by the recipient of the message to verify that the time at which the signature is being verified is between the creation and expiration times.

As another example, the object 400 includes a "signatureAlgorithm" name/value pair 408 that has a value "RS256" that identifies the signature algorithm used to generate the signature. In particular, the value identifies which public-key cryptosystem will be used (RSA) and which cryptographic hash function will be used (SHA256). As another example, the object 400 includes a "nonce" name-value pair 410 that has a value that is used to uniquely identify the message, i.e., that is a string that is unique to the message.

As another example, the object 400 includes a "samlToken" name-value pair 412 that has a value that is a SAML token that includes the public key that corresponds to the private key used to generate the digital signature. Additionally, the object 400 includes a "value" name-value pair 414 that has a value of the encoded digital signature string for the JSON message. The encoded string was generated by the digital signature engine by computing a cryptographic hash of the message, encrypting the hash with a private key to generate a digital signature, and then encoding the digital signature.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a JavaScript Object Notation (JSON) message that includes one or more JSON objects;
   digitally signing the JSON message, wherein digitally signing the JSON message comprises:
      generating a digital signature information JSON object;
      inserting the digital signature information JSON object into the JSON message;
      after inserting the digital signature information JSON object into the JSON message, generating a canonical representation of the JSON message, wherein the canonical representation of the JSON message includes the inserted digital signature information JSON object and the one or more JSON objects of the received JSON message;
      computing a cryptographic hash of the canonical representation of the JSON message that includes the inserted digital signature information JSON object and the one or more JSON objects;
      generating a digital signature of the canonical representation of the JSON message using the cryptographic hash of the canonical representation of the JSON message; and
      inserting the digital signature into the digital signature information JSON object; and
   providing the JSON message, which includes the digital signature information JSON object having the inserted digital signature, for transmission to a recipient.

2. The method of claim 1, wherein the digital signature information JSON object includes data identifying a digital signature algorithm used to generate the digital signature.

3. The method of claim 2, wherein the data identifying the digital signature algorithm includes data identifying a cryptographic hash function.

4. The method of claim 3, wherein computing the cryptographic comprises:
   computing the cryptographic hash of the canonical representation using the cryptographic hash function; and
   wherein generating the digital signature of the canonical representation comprises:
      generating the digital signature by encrypting the cryptographic hash using a private key; and
      encoding the digital signature.

5. The method of claim 4, wherein digitally signing the JSON message further comprises:
inserting data identifying a public key corresponding to the private key in the digital signature information JSON object.

6. The method of claim 1, wherein the digital signature information JSON object includes data defining a validity period of the digital signature.

7. The method of claim 1, wherein the digital signature information JSON object includes a unique identifier for the JSON message.

8. A computer-implemented method comprising:
receiving a JavaScript Object Notation (JSON) message, wherein the JSON message includes a digital signature information JSON object and one or more JSON objects, and wherein the digital signature information JSON object includes a digital signature for the JSON message; and
verifying the digital signature for the received JSON message, wherein verifying the digital signature for the JSON message comprises:
removing the digital signature from the digital signature information JSON object;
after removing the digital signature from the digital signature information JSON object, generating a canonical representation of the JSON message that includes the one or more JSON objects and the digital signature information JSON object without the digital signature;
computing a cryptographic hash of the canonical representation of the JSON message that includes the one or more JSON objects and the digital signature information JSON object without the digital signature;
decrypting the digital signature; and
verifying the digital signature based on a comparison between the decrypted digital signature and the cryptographic hash.

9. The method of claim 8, wherein the digital signature information JSON object includes data identifying a cryptographic hash function used to generate the digital signature.

10. The method of claim 9, wherein computing the cryptographic hash of the canonical representation comprises computing the cryptographic hash of the canonical representation using the cryptographic hash function.

11. The method of claim 8, wherein decrypting the digital signature comprises decrypting the digital signature using a public key identified in the digital signature information JSON object.

12. The method of claim 8, wherein the digital signature information JSON object includes data defining a validity period of the digital signature, and wherein verifying the digital signature comprises determining that the validity period is satisfied.

13. The method of claim 8, wherein the digital signature information JSON object includes a unique identifier for the JSON message, and wherein verifying the digital signature comprises determining that no JSON message with an identifier that matches the unique identifier has already been verified.

14. A system comprising one or more computers and one or more storage devices storing instructions that when executed by the one or more computers cause the one or more computers to perform operations comprising:
receiving a JavaScript Object Notation (JSON) message that includes one or more JSON objects;
digitally signing the JSON message, wherein digitally signing the JSON message comprises:
generating a digital signature information JSON object;
inserting the digital signature information JSON object into the JSON message;
after inserting the digital signature information JSON object into the JSON message, generating a canonical representation of the JSON message, wherein the canonical representation of the JSON message includes the inserted digital signature information JSON object and the one or more JSON objects of the received JSON message;
computing a cryptographic hash of the canonical representation of the JSON message includes the inserted digital signature information JSON object and the one or more JSON objects;
generating a digital signature of the canonical representation of the JSON message using the cryptographic hash of the canonical representation of the JSON message; and
inserting the digital signature into the digital signature information JSON object; and
providing the JSON message, which includes the digital signature information JSON object having the inserted digital signature, for transmission to a recipient.

15. The system of claim 14, wherein the digital signature information JSON object includes data identifying a digital signature algorithm used to generate the digital signature.

16. The system of claim 15, wherein the data identifying the digital signature algorithm includes data identifying a cryptographic hash function.

17. The system of claim 16, wherein computing the cryptographic hash comprises:
computing the cryptographic hash of the canonical representation using the cryptographic hash function; and
wherein generating the digital signature of the canonical representation comprises:
generating the digital signature by encrypting the cryptographic hash using a private key; and
encoding the digital signature.

18. The system of claim 17, wherein digitally signing the JSON message further comprises:
inserting data identifying a public key corresponding to the private key in the digital signature information JSON object.

19. The system of claim 14, wherein the digital signature information JSON object includes data defining a validity period of the digital signature.

20. The system of claim 14, wherein the digital signature information JSON object includes a unique identifier for the JSON message.

* * * * *